United States Patent
Fritz et al.

(10) Patent No.: US 8,743,196 B2
(45) Date of Patent: Jun. 3, 2014

(54) SYSTEM AND METHOD FOR PERFORMING AN EXTERNAL INSPECTION ON A WIND TURBINE ROTOR BLADE

(75) Inventors: Peter James Fritz, Greenville, SC (US); Kevin George Harding, Niskayuna, NY (US); Bradley Graham Moore, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/969,945

(22) Filed: Dec. 16, 2010

(65) Prior Publication Data

US 2011/0205348 A1    Aug. 25, 2011

(51) Int. Cl.
*H04N 9/47*      (2006.01)
*F03B 3/12*      (2006.01)

(52) U.S. Cl.
USPC .............................. 348/92; 416/229

(58) Field of Classification Search
USPC ......... 348/92, 144; 244/33; 73/455; 415/118; 416/1, 61, 229
See application file for complete search history.

(56) References Cited

U.S. PATENT DOCUMENTS

| | | | |
|---|---|---|---|
| 4,146,967 A | 4/1979 | Rohner et al. | |
| 6,966,754 B2 * | 11/2005 | Wobben | 416/61 |
| 2006/0175465 A1 * | 8/2006 | Teichert | 244/33 |
| 2007/0056801 A1 | 3/2007 | Iversen | |
| 2008/0206052 A1 | 8/2008 | Volkmier | |
| 2009/0246019 A1 | 10/2009 | Volanthen et al. | |
| 2009/0266160 A1 * | 10/2009 | Jeffrey et al. | 73/455 |
| 2010/0103260 A1 * | 4/2010 | Williams | 348/144 |
| 2010/0135788 A1 * | 6/2010 | Qu | 416/1 |
| 2010/0215493 A1 | 8/2010 | Abdullah et al. | |
| 2011/0103933 A1 * | 5/2011 | Olesen et al. | 415/118 |

FOREIGN PATENT DOCUMENTS

| | | |
|---|---|---|
| CN | 101874158 A | 10/2010 |
| DE | 10 2009 022 179 A1 | 11/2010 |

OTHER PUBLICATIONS

U.S. Appl. No. 12/955,384, filed Nov. 29, 2010.
U.S. Appl. No. 12/955,412, filed Nov. 29, 2010.
International Search Report issued to corresponding WO Application No. PCT/CN2011/000098, Oct. 27, 2011.

* cited by examiner

*Primary Examiner* — Gims Philippe
(74) *Attorney, Agent, or Firm* — Dority & Manning, P.A.

(57) ABSTRACT

A system and method for performing an external inspection on a rotor blade of a wind turbine are disclosed. The system may generally include a frame configured to extend at least partially around an outer perimeter of the rotor blade and a sensing device coupled to the frame. Additionally, first and second spacer arms may extend from the frame. The first spacer arm may be configured to contact a pressure side surface of the rotor blade. The second spacer arm may be configured to contact a suction side surface of the rotor blade.

20 Claims, 5 Drawing Sheets

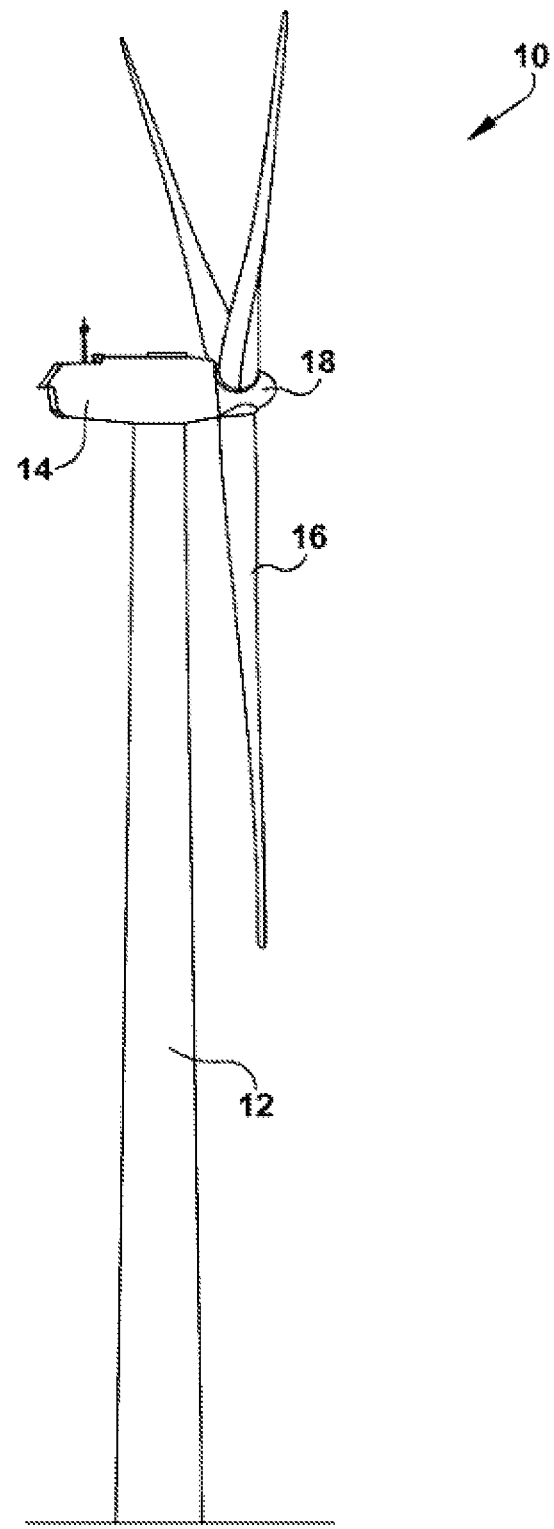
FIG. -1-

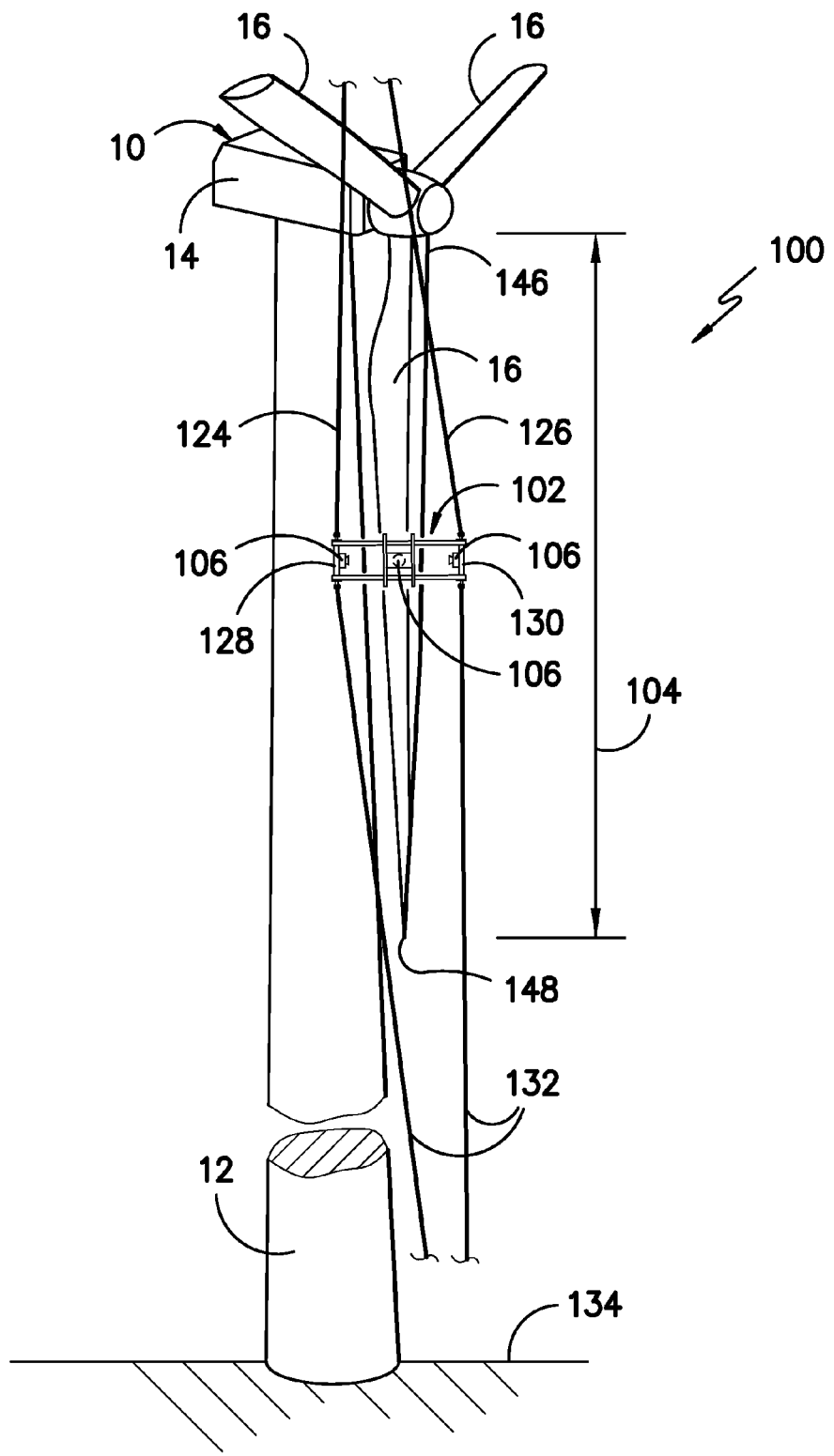
FIG. -2-

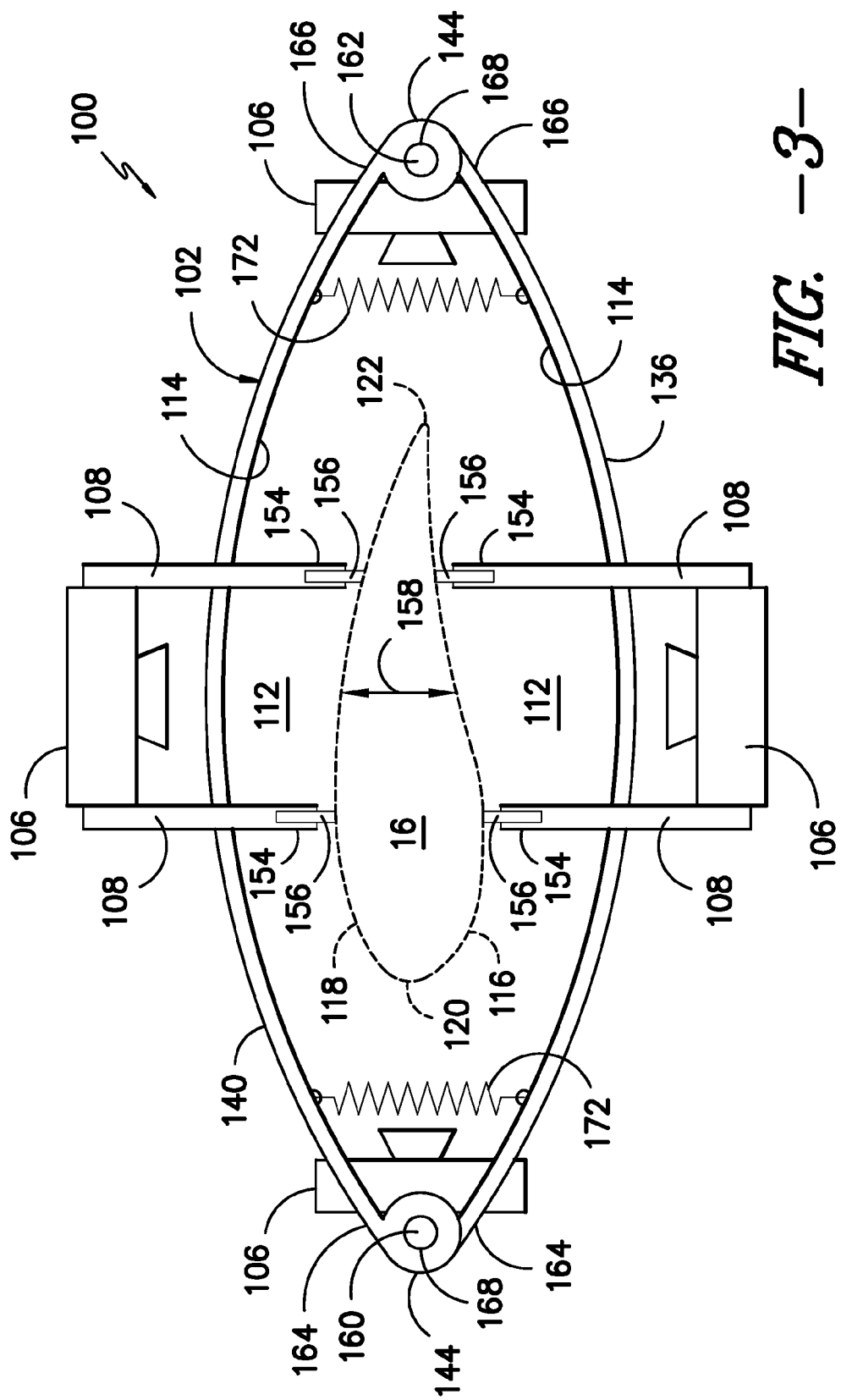
FIG. -3-

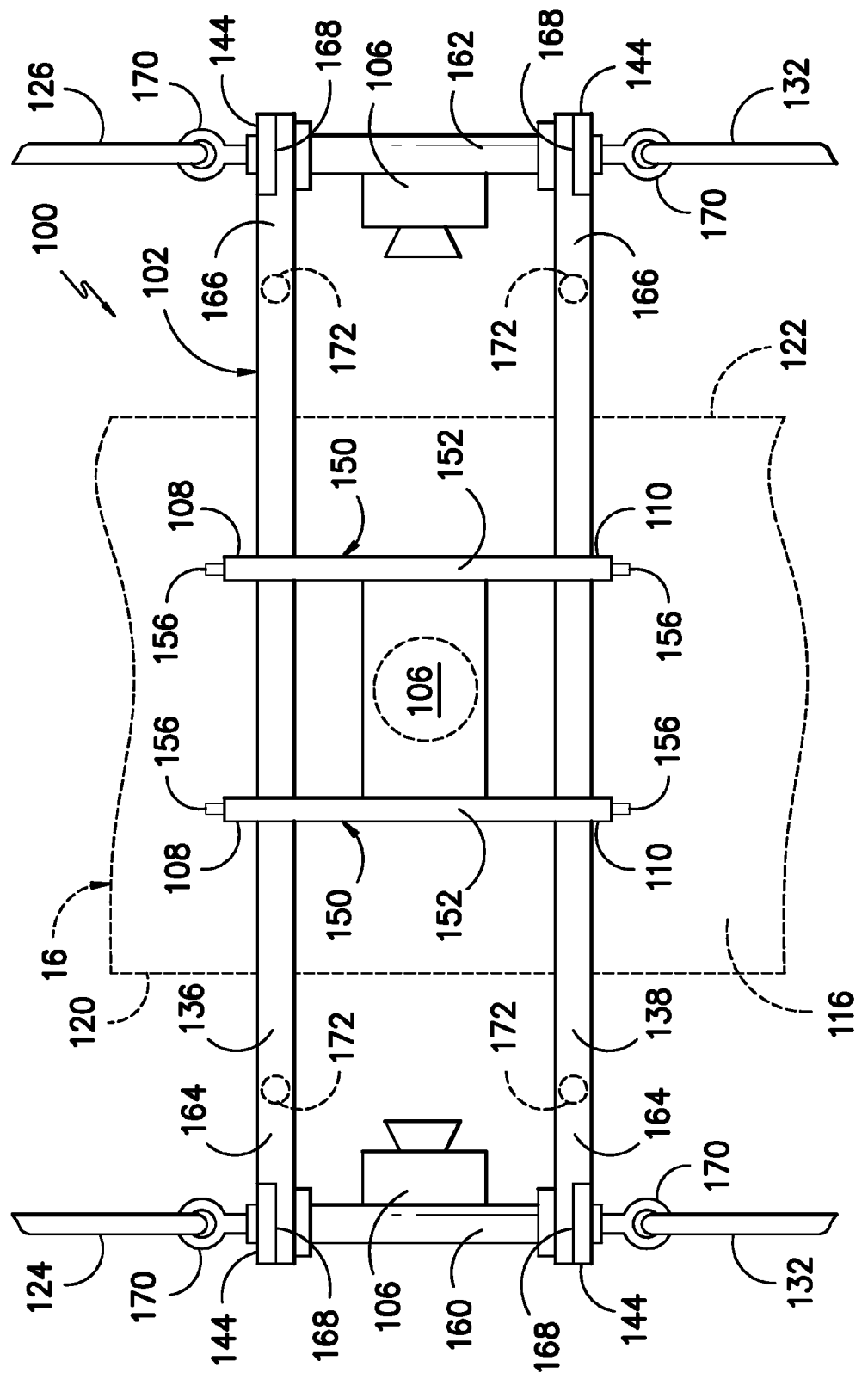
FIG. -4-

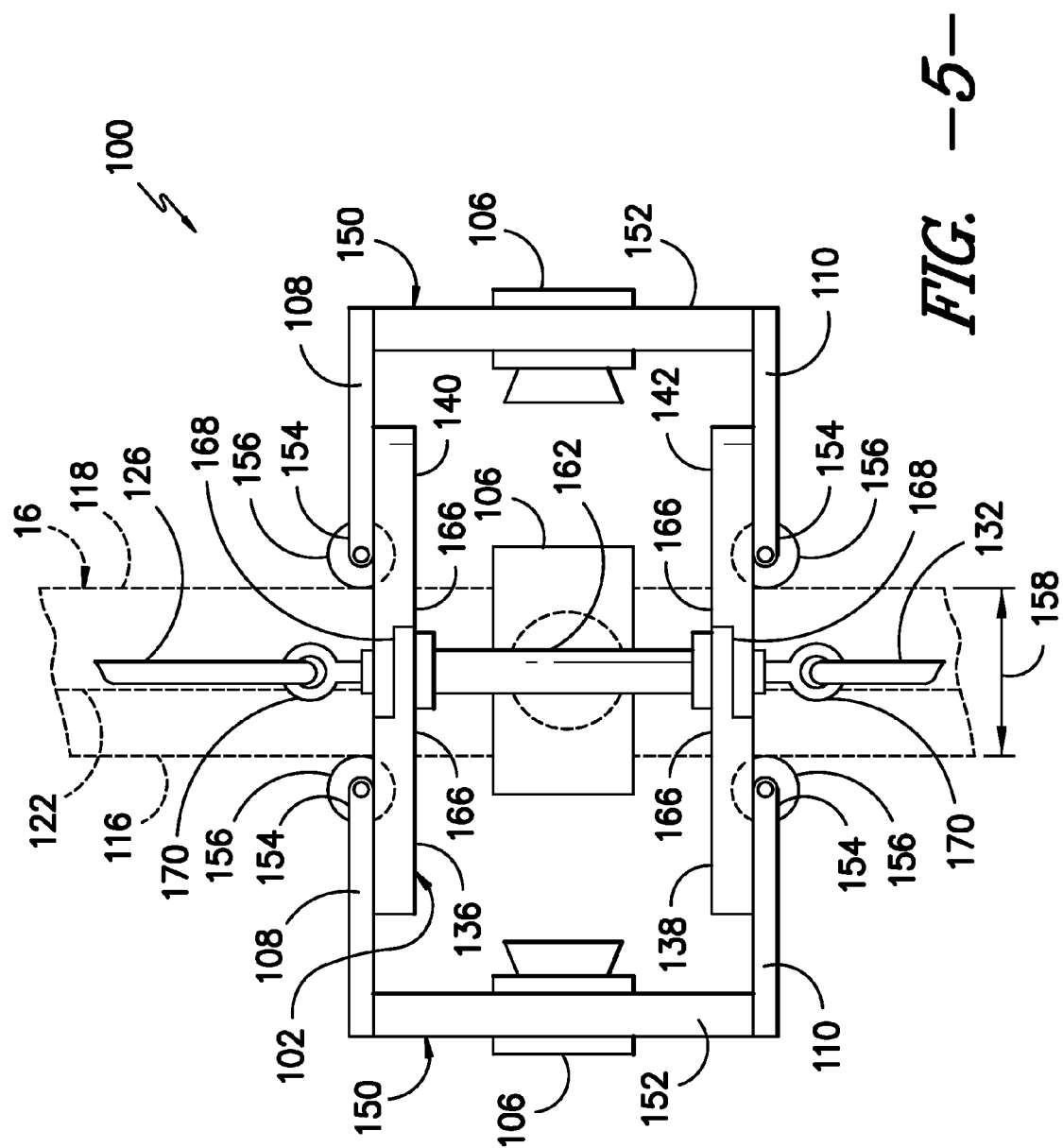

SYSTEM AND METHOD FOR PERFORMING AN EXTERNAL INSPECTION ON A WIND TURBINE ROTOR BLADE

FIELD OF THE INVENTION

The present subject matter relates generally to wind turbines and, more particularly, to a system and method for performing an external inspection on a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The maintenance of wind turbine components is critical to the ongoing operation of a wind turbine. Thus, maintenance operations, such as inspections, are routinely performed on wind turbine rotor blades to ensure that they are in optimal operating condition. For example, visual inspections of the exterior of a rotor blade may be performed to identify cracks and other potential defects. To perform such visual inspections, conventional methods require the use of a telescope disposed adjacent to the base of the wind turbine. In particular, an operator must typically scan the entire length of the blade looking for defects. As such, the use of such an inspection method is generally very time consuming. Additionally, it is often difficult to detect small surface defects using the telescope.

Accordingly, there is a need for an efficient and effective system for performing an external inspection on a wind turbine rotor blade.

BRIEF DESCRIPTION OF THE INVENTION

Aspects and advantages of the invention will be set forth in part in the following description, or may be obvious from the description, or may be learned through practice of the invention.

In one aspect, the present subject matter discloses a system for performing an external inspection on a rotor blade of a wind turbine. The system may generally include a frame configured to extend at least partially around an outer perimeter of the rotor blade and a sensing device coupled to the frame. Additionally, the system may include first and second spacer arms extending from the frame. The first spacer arm may be configured to contact a pressure side surface of the rotor blade. The second spacer arm may be configured to contact a suction side surface of the rotor blade.

In another aspect, the present subject matter discloses a method for performing an external inspection on a rotor blade. The method may generally include positioning a frame around at least a portion of an outer perimeter of the rotor blade, coupling a sensing device to the frame, moving the frame along the span of the rotor blade, contacting a first spacer arm against a pressure side surface of the rotor blade as the frame is moved along the span of the rotor blade and contacting a second spacer arm against a suction side surface of the rotor blade as said frame is moved along the span of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a partial, perspective view of one embodiment of a system for performing an external inspection on a wind turbine rotor blade in accordance with aspects of the present subject matter;

FIG. 3 illustrates a top view of a portion of the system shown in FIG. 2;

FIG. 4 illustrates a side view of the portion of the system shown in FIG. 2; and, FIG. 5 illustrates an edge view of the portion of the system shown in FIG. 2.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a system for performing an external inspection on a rotor blade. For example, in several embodiments, a system is disclosed that includes a frame configured to be raised and lowered along the span of the rotor blade. One or more sensing devices may be coupled to the frame in order to provide information regarding the condition of the blade. Additionally, a one or more spacer arms may extend inwardly from the frame so as to space the frame apart from the rotor blade.

As used herein, the term "inspection" refers to any operation, action and/or test performed on a wind turbine that is designed to monitor, sense, locate, measure and/or detect a condition of any component of the wind turbine and, particularly, a condition of a rotor blade of the wind turbine. For example, inspections may include, but are not limited to, visual inspections of the exterior of the rotor blades, optical nondestructive evaluation (NDE) tests (e.g., shearography tests), thermography tests and other related operations/tests. Additionally, the term "sensing device" may refer to any suitable sensor, equipment, mechanism and/or any other item that may be utilized to monitor, sense, locate, measure and/or detect a condition of a component of a wind turbine. Thus, sensing devices may include, but are not limited to, visual cameras, infrared cameras, ultraviolet cameras, video cameras, other suitable cameras, ultrasonic detectors, x-ray detectors, other suitable imaging devices and sensors, light sources (e.g., a light-emitting diode (LED) array), proximity sensors, position sensors, displacement sensors, linear encoders, measurement devices, laser scaling devices, magnetic sensing equipment, ultrasound equipment, microwave instrumentation, active infrared equipment, optical NDE testing equipment, thermography testing equipment and/or any other suitable equipment, sensors, mechanisms and/or items.

Thus, in several embodiments, the system of the present subject matter may be configured to perform an external visual inspection on a wind turbine rotor blade. For example, it may be desirable to visually inspect the external surfaces of the rotor blade for anomalies, such as cracks and other defects. Accordingly, in such embodiments, the disclosed sensing device(s) may comprise one or more suitable optical and/or imaging devices configured to monitor, locate, sense, measure and/or detect such anomalies. For instance, in a particular embodiment of the present subject matter, the sensing device(s) may comprise one or more remote controlled pan tilt zoom (PTZ) cameras configured to capture images of the exterior of a rotor blade.

Referring now to the drawings, FIG. 1 illustrates a wind turbine 10 of conventional construction. The wind turbine 10 generally includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. The wind turbine 10 of FIG. 1 is generally provided for illustrative purposes only to place the present subject matter in an exemplary field of use. Thus, it should be appreciated that the present subject matter is not limited to any particular type of wind turbine configuration.

Referring now to FIGS. 2-5, there is illustrated one embodiment of a system 100 for performing an external inspection on a rotor blade 16 of a wind turbine 10. In particular, FIG. 2 illustrates a partial, perspective view of one embodiment of the system 100 installed on the exterior of the rotor blade 16 in accordance with aspects of the present subject matter. Additionally, FIGS. 3-5 illustrate respective top, side and edge views of a portion of the system shown in FIG. 2.

In general, the system 100 may include a frame 102 configured to be raised and lowered along the span 104 of the rotor blade 16. Additionally, one or more sensing devices 106 may be coupled to the frame 102 for monitoring, sensing, measuring and/or detecting a condition(s) of the rotor blade 16 as the frame 102 is moved along the blade 16. The system may also include one or more spacer arms 108, 110 extending inwardly from the frame 102. The spacer arm(s) 108, 110 may generally be configured to contact the outer perimeter of the rotor blade 16 so as to maintain a gap 112 between the outer perimeter and an inner surface 114 of the frame 102. As is generally understood, the outer perimeter of the rotor blade 16 may generally be defined by pressure and suction side surfaces 116, 118 extending between the leading and trailing edges 120, 122 of the blade 16.

The frame 102 of the disclosed system 100 may generally serve as a carriage for transporting the sensing device(s) 106 along the span 104 of the rotor blade 16. For example, in embodiments in which a visual inspection of the exterior of the rotor blade 16 is being performed, the frame 102 may be configured to transport suitable optical equipment (e.g., one or more cameras and the like) up and down the blade 16 to permit images and other information regarding the exterior of the blade 16 to be captured. In other embodiments, the frame 102 may be configured to transport a combination of different types of sensing devices 106 along the span 104 of the rotor blade 16, such by transporting one or more cameras together with light sources, proximity sensors, measurement devices, laser scaling devices and the like up and down the blade 16.

The frame 102 may generally be raised and lowered along the rotor blade 16 using any suitable means known in the art. For instance, in several embodiments, one or more cables 124, 126 may be attached to the frame 102 to allow it to be moved vertically along the span 104 of the rotor blade 16. In particular, as shown in FIG. 2, a first cable 124 may be attached to a first end 128 of the frame 102 and a second cable 126 may be attached to a second end 130 of the frame 102, with each of the cables 124, 126 extending upwardly to an uptower component of the rotor blade 16 (e.g., the nacelle 14 and/or the hub 18 of the wind turbine 10). The cables 124, 126 may then be vertically displaced using any suitable lifting method and/or mechanism. For example, in one embodiment, the cables 124, 126 may be pulled and lowered manually, such as by having one or more operators manipulate the vertical position of the frame from a location on or within the nacelle 14 and/or the hub 18. In other embodiments, the cables 124, 126 may be vertically displaced using one or more lifting mechanisms and/or pulley mechanisms (not shown) (e.g., electric winches, pulleys and/or any other similar devices) mounted on or within the nacelle 14, the hub 18 and/or at any other suitable location. It should be appreciated that, in one embodiment of the present subject matter, one or more drop cables 132 may also extend downwardly from the frame 102 to allow the position of the frame 102 to be manipulated from a location adjacent to the support surface 134 of the wind turbine 10. For example, as shown in FIG. 2, cables 132 may extend between the ends 128, 130 of the frame 102 and the support surface 134.

Additionally, the disclosed frame 102 may generally have any suitable configuration that allows the frame 102 to be positioned proximal to the rotor blade 16 as it is raised and lowered. For example, in several embodiments, the frame 102 may define a closed shaped extending around the entire outer perimeter of the rotor blade 16. Thus, in the illustrated embodiment, the frame 102 may include a plurality of curved frame members 136, 138, 140, 142 configured to be attached to one another around the outer perimeter of the rotor blade 16. In particular, the frame 102 may include an upper frame member 136 and a lower frame member 138 spaced apart from and extending around the pressure side surface 116 of the rotor blade 16. Similarly, the frame 102 may include upper and lower frame members 140, 142 spaced apart from and extending around the suction side surface 118 of the rotor blade 16. Accordingly, the pressure side frame members 136, 138 and the suction side frame members 140, 142 may generally be configured to be attached to one another at attachment points 144 generally aligned at the leading and trailing edges 120, 122 of the rotor blade 16. As will be described below, in several embodiments, such attachment points 144 may be configured as hinge or pivot points to allow the frame members 136, 138, 140, 142 to rotate relative to one another as the frame 102 is raised and lowered along the rotor blade 16.

It should be appreciated that frame 102 of the disclosed system 100 may be installed around the outer perimeter of the rotor blade 16 using a variety of different methods. For example, in one embodiment, the rotor blade 16 may be rotated to a vertically upwards position on the hub 18 (i.e., a twelve o'clock position) to allow the frame 102 to be assembled around the blade 16 at the blade root 146. The rotor blade 16 may then be rotated to a vertically downwards position (i.e., a six o'clock position) to allow the frame 102 to be raised and lowered along the span 104 of the rotor blade 16. In other embodiments, the rotor blade 16 may be initially positioned in the vertically downwards position and the assembled frame 102 may be lowered down from the hub 18 and/or the nacelle 14 so as to be aligned with the blade tip 148. The frame 102 may then be raised up around rotor blade 16.

It should also be appreciated that, in alternative embodiments of the present subject matter, the disclosed frame 102 need not include four frame members 136, 138, 140, 142 as shown in FIGS. 3-5, but may generally include any number of frame members extending around the outer perimeter of the rotor blade 16. For example, in one embodiment, the frame 102 may only include two frame members, with one frame member extending along the pressure side surface 116 of the rotor blade 16 and another frame member extending along the suction side surface 118. Additionally, the frame 102 may generally be configured to define any suitable shape and, thus, need not define the curved, two-sided shape shown in FIG. 3. For instance, in another embodiment, the frame 102 may be configured to be substantially rectangular in shape and may include straight frame members forming each side of the rectangle.

Referring still to FIGS. 2-5, as indicated, the disclosed system 100 may also include one or more spacer arms 108, 110 extending inwardly from the frame 102. For example, in several embodiments of the present subject matter, the system 100 may include a plurality of spacer arms 108, 110, with each spacer arm 108, 110 forming part of a mounting bracket 150 for mounting one or more sensing devices 106 to the frame 102. In particular, as shown in FIGS. 3-5, one or more semi-rectangular or "C" shaped mounting brackets 150 may be disposed on each side of the frame 102. Each mounting bracket 150 may include an upper spacer arm 108 mounted to one of the upper frame segments 136, 140 of the frame 102 and a lower spacer arm 110 mounted to one of the lower frame segments 138, 142 of the frame 102. Additionally, each mounting bracket 150 may include a connecting member 152 extending between the upper and lower spacer arms 108, 110. The connecting members 152 may generally be configured to be disposed substantially perpendicular to the spacer arms 108, 110 and, thus, substantially parallel to the pressure and suction side surfaces 116, 118 of the rotor blade 16. Thus, in the illustrated embodiment, one or more sensing devices 106 may be mounted to each connecting member 152 and/or between two connecting members 152 so as to be oriented in the direction of the pressure or suction side surface 116, 118. For example, in several embodiments, one or more cameras may be mounted in such locations to enable images of the pressure and/or suction side surfaces 116, 118 to be captured as the frame 102 is raised and lowered along the rotor blade 16. It should be appreciated that, in one embodiment, the connecting members 152 may be formed integrally with the upper and lower spacer arms 108, 110. Alternatively, the connecting members 152 may be manufactured as separate components and may be subsequently attached to the spacer arms 108, 110 in order to form the mounting bracket 150.

In general, the spacer arms 108, 110 may comprise elongated, rigid members configured to extend, at least partially, inwardly from the frame 102. In particular, the spacer arms 108, 110 may be configured to be attached to the frame 102 such that at least a portion of each spacer arm 108, 110 extends inwardly from the frame so as to contact an exterior surface 116, 118 of the rotor blade 16. As such, the spacer arms 108, 110 may generally serve to separate the inner surface 114 of the frame from the outer perimeter of the rotor blade 16. Additionally, the spacer arms 108, 110 may provide a means for centering or otherwise properly positioning the frame 102 relative to the rotor blade 16 as it is raised and lowered along the blade 16. Thus, as shown in the illustrated embodiment, the spacer arms 108, 110 may be configured to extend inwardly from the frame members 136, 138, 140, 142 such that an end 154 of each spacer arm 108, 110 contacts the pressure side surface 116 or the suction side surface 118 of the rotor blade 16. As such, a gap 112 may generally be defined between the inner surface 114 of the frame 102 and the exterior surfaces 166, 118 of the rotor blade 16. It should be appreciated that the spacer arms 108, 110 may configured to be attached to the frame members 136, 138, 140, 142 using any suitable attachment means and/or method known in the art. For instance, in one embodiment, the spacer arms 108, 110 may be welded to the frame members 136, 138, 140, 142. Alternatively, the spacer arms 108, 110 may be attached to the frame members 136, 138, 140, 142 using suitable fasteners (e.g., screws, bolts, rivets, pins and the like).

Due to the configuration of the spacer arms 108, 110, the ends 154 of the spacer arms 108, 110 may generally rub/slide against or otherwise engage the exterior surfaces 116, 118 of the rotor blade 16 as the frame 102 is moved along the blade 16. Thus, in several embodiments, the ends 154 of the spacer arms 108, 110 may include a contact feature configured to reduce friction at the interface between the spacer arms 108, 110 and the exterior surfaces 116, 118 of the rotor blade 16. For example, in one embodiment, a rubber guide/pad and/or any other flexible member may be attached to the ends 154 of the spacer arms 108, 110 to provide a smooth and/or flexible, low-friction interface. Alternatively, as shown in the illustrated embodiment, a roller 156 (e.g., a wheel, caster and/or any other suitable rolling mechanism) may be disposed at the end 154 of each spacer arm 108, 110 to permit the end 154 to roll against the exterior surfaces 116, 118 of the rotor blade 16 and, thus, provide a low friction interface between the spacer arms 108, 110 and the exterior surfaces 116, 118.

It should be appreciated that, in alternative embodiments, the spacer arms 108, 110 need not form part of a mounting bracket 150. In particular, in several embodiments of the present subject matter, each spacer arm 108, 110 may comprise a separate component configured to be mounted to the frame 102 so as to extend inwardly and contact an exterior surface 116, 118 of the rotor blade 16. For instance, the spacer arms 108, 110 may be configured to be attached to the inner surfaces 114 of the frame members 136, 138, 140, 142 and may extend inwardly therefrom in order to space the frame 102 apart from the rotor blade 16. Additionally, it should be appreciated that the system 100 of the present subject matter may include any number of spacer arms 108, 110 and, thus, need not include the exact number of spacers arms 108, 110 shown in the illustrated embodiment. For example, the system 110 may simply include a first spacer arm configured to contact the pressure side surface 116 of the rotor blade 16 and a second spacer arm configured to contact the suction side surface 118 of the rotor blade 16.

Referring still to FIGS. 2-5, in several embodiments of the present subject matter, the frame 102 may have a hinged configuration in order to accommodate the varying cross-sectional area of the rotor blade 16 between the blade tip 148 and the blade root 146. For example, the height 158 defined between the pressure and suction side surfaces 116, 118 of the rotor blade 16 may generally increase from the blade tip 148 to the blade root 146 and vice versa. Thus, in several embodiments, the frame 102 may be configured to expand and contract relative to the pressure and suction side surfaces 116, 118 of the rotor blade 16. In particular, the attachment points 144 defined between the frame members 136, 138, 140, 142 may be configured as hinge or pivot points to allow the opposing frame members 136, 138, 140, 142 to rotate towards and away from one another as the frame 102 is moved along the rotor blade 16. As such, the ends 154 of the spacer arms 108, 100 may be configured to remain in contact with the exterior surfaces 116, 118 of the rotor blade 16 along at least a substantial portion of the blade's span 104.

In general, the frame 102 may have any suitable hinged or pivotal attachment configuration known in the art. For example, in one embodiment, a set of hinge pins or pivot rods 160, 162 may be used to pivotally attach the frame members 136, 138, 140, 142 to another. Specifically, as shown in the illustrated embodiment, a first pivot rod 160 may generally be disposed at the interface of the leading edge ends 164 of the frame members 136, 138, 140, 142 and a second pivot rod 162 may generally be disposed at the trailing edge ends 166 of the frame members 136, 138, 140, 142. The ends 164, 166 of the frame members 136, 138, 140, 142 may then be pivotally attached to the pivot rods 160, 162 to allow the frame members 136, 138, 140, 142 to rotate relative to one another about the axes defined by the pivot rods 160, 162. For example, the ends 164, 166 may be configured similarly to the overlapping hinge cylinders of a conventional hinge, such as by configuring the ends 164, 166 define overlapping openings for receiving the pivot rods 160, 162. Additionally, by configuring the pivot rods 160, 162 as shown in the illustrated embodiment, it should be appreciated that the pivot rods 160, 162 may also serve as an attachment mechanism for attaching the cables 124, 126, 132 and/or one or more sensing devices 106 to the frame 102. For example, the portion of each pivot rod 160, 162 extending between the upper frame members 136, 140 and the lower frame members 138, 142 may provide a mounting surface for coupling one or more sensing devices 106 to the frame 102. Thus, in a particular embodiment of the present subject matter, one or more cameras may be mounted to each pivot rod 160, 162 to enable images of the leading and trailing edges 120, 122 of the rotor blade 16 to be captured as the frame 102 is raised and lowered along the blade 16. Similarly, the portions of each rod 160, 162 extending vertically from the frame members 136, 138, 140, 142 may be configured to define openings 170 or may include other attachment features for coupling the disclosed cables 124, 126, 132 to the frame 102. However, in other embodiments, the cables 124, 126, 132 may be attached to the frame 102 at any other suitable location.

It should be appreciated that, in alternative embodiments, the ends 164, 166 of the frame members 136, 138, 140, 142 may be rotationally or pivotally attached to one another using any other suitable means. For instance, the frame members 136, 138, 140, 142 may be pivotally attached using bearings, other hinged configurations and/or any other suitable pivotal and/or rotational attachment mechanisms known in the art.

Moreover, it should be appreciated that, to permit the frame members 136, 138, 140, 142 to pivot about the hinged attachment points, the frame members 136, 138, 140, 142 may generally be configured to flex or bow as the frame 102 is raised and lowered along the blade 16. For example, as the frame 102 is moved in the direction of the blade root 146 and the height 158 defined between pressure and suction side surfaces 116, 118 increases, the spacer arms 108, 110 contacting such surfaces 116, 118 may generally exert an outward force against the frame members 136, 138, 140, 142. As a result, the frame members 136, 138, 140, 142 may flex/bow outwardly and pivot about the attachment points 144, thereby causing the ends 164, 166 of the frame members 136, 138, 140, 142 to move inwards towards the rotor blade 16 (e.g., towards the leading and trailing edges 120, 122 of the blade 16). Similarly, as the frame 102 is moved in the direction of the blade tip 148 and the height 158 decreases, the frame members 136, 138, 140, 142 may generally be configured to pivot inwardly in order to maintain contact between the ends 154 of the spacer arms 108, 110 and the rotor blade 16.

Accordingly, the frame members 136, 138, 140, 142 may generally define any suitable dimensions and/or may be formed from any suitable material that allows the frame members 136, 138, 140, 142 to flex inwardly and outwardly as the frame 102 is raised and lowered along the rotor blade 16. For example, in several embodiments, each frame member 136, 138, 140, 142 may comprise an elongated, curved member exhibiting a relatively low spring rate through its curvature. Thus, in one embodiment, the frame members 136, 138, 140, 142 may be formed from strips of spring steel or any other suitable metal member configured to flex/bow. Alternatively, the frame members 136, 138, 140, 142 may be formed from various other suitable materials, such as flexible polymers, flexible composites and the like.

Additionally, depending on the structural properties of the frame members 136, 138, 140, 142 (e.g., the spring rate of the frame members 136, 138, 140, 142), it may be desirable to couple one or more tensioning devices 172 between the frame members 136, 138, 140, 142. For example, as particularly shown in FIG. 3, tensioning devices 172 may be coupled between the pressure side frame members 136, 138 and the suction side frame members 140, 142. In general, the tensioning devices 172 may be configured to bias the frame members 136, 138, 140, 142 inwardly towards the rotor blade 16 and, thus, may provide a means for maintaining the spacer arms 108, 110 in contact with the rotor blade 16 as the frame 102 is moved in the direction of the blade tip 148. In the illustrated embodiment, the tensioning devices 172 may comprise springs secured between the frame members 136, 138, 140, 142. However, in other embodiments, the tensioning devices 172 may comprise any other suitable device and/or item capable of providing a biasing or tensioning force between the frame members 136, 138, 140, 142.

Moreover, in alternative embodiments, it should be appreciated that the frame 101 need not have a hinged configuration. For example, the frame members 136, 138, 140, 142 may be formed from a rigid material and/or may be rigidly attached to one another. In such an embodiment, the spacer arms 108, 110 may be configured to account for the varying height 158 of the rotor blade 16 between the blade root 146 and the blade tip 148. For instance, in several embodiments, at least a portion of each spacer arm 108, 110 may be formed from a flexible material that permits the spacer arm 108, 110 to flex/bow as the height 158 increases and to straighten when the height 158 decreases. In alternative embodiments, the spacer arms 108, 110 may include telescoping features to allow the length of each arm 108, 110 to adjust as the height 158 increase and decreases. Thus, in one embodiment, each spacer arm 108, 110 may include a spring loaded telescoping feature configured to bias the ends 154 of the spacer arms 108, 110 outwardly towards the exterior surfaces 116, 118 of the rotor blade 16. For example, the spacer arms 108, 110 may be formed from two or more spring loaded, telescoping cylinders. It should be appreciated that the spacer arms 108, 110 may also include flexible materials and/or have telescoping features in embodiments in which the frame 102 does have a hinged configuration.

It should also be appreciated that the sensing device(s) 106 of the disclosed system may generally be coupled to the frame 102 and/or any other component of the disclosed system 100 at any suitable location that permits the device(s) 106 to capture information useful in performing the desired inspection, such as by monitoring, sensing, measuring, locating and/or detecting a condition or defect on the exterior surfaces 116, 118 of the rotor blade 16. For example, as indicated above, one or more sensing devices 106 may be attached to the connecting members 152 of the mounting brackets 150 and/or to the pivot rods 160, 162 of the frame 102. In addition to such locations or as an alternative thereto, one or more sensing devices 106 may also be built into or otherwise directly attached to the frame members 136, 138, 140, 142. For instance, a one or more sensing devices 106 may be mounted along the sides of each frame member 136, 138, 140, 142. Additionally, in further embodiments, one or more sensing devices 106 may be coupled to the frame 102 and/or any other component of the disclosed system 100 through mounting platforms and/or any other suitable item having a mounting surface configured to support one or more sensing devices 106.

Additionally, it should be appreciated that, in several embodiments, the sensing device(s) 106 disclosed herein may be configured to be communicatively coupled (e.g., through a wireless or wired connection) to a display device, processing equipment and/or any other suitable device (not shown) to allow images and/or other information captured by the sensing device(s) 106 to be transmitted, viewed and/or recorded while the external inspection is being performed. For example, the sensing device(s) 106 may be communicatively coupled to a display device (e.g., a laptop or any other suitable equipment having a display screen) such that the operator performing the inspection may view the images and/or other information as it is captured by the sensing device(s) 106. Thus, in the illustrated embodiment, a display device may be positioned on or within the nacelle 14, hub 18 or at any other suitable location an operator is located to permit the position of the sensing device(s) 106 along the span 104 of the rotor blade 16 to be manipulated based on the images and/or other information displayed on such display device.

Moreover, in further embodiments, one or more of the disclosed sensing devices 106 may be communicatively coupled to a device controller and/or any other device that allows the sensing device(s) 106 to be operated remotely through a wired or wireless connection. For instance, in a particular embodiment of the present subject matter, the sensing device(s) 106 may comprise one or more remote controlled pan tilt zoom (PTZ) cameras. As is generally understood, PTZ cameras may be configured to rotate in various directions and zoom in and out to adjust the field of view of the camera. Thus, the operator performing the inspection may automatically adjust the orientation of the camera to allow various different images of the exterior of the rotor blade 16 to be captured. Such a feature may be particularly advantageous in embodiments in which the operator is provided with a display screen for viewing the images and/or other information captured by the PTZ camera, as the orientation of the camera may be adjusted based on the images/information viewed on the display screen.

Additionally, in several embodiments, the sensing device(s) 106 of the present subject matter may include a combination of optical equipment (e.g., cameras) and one or more light sources configured to illuminate the areas of interest of the rotor blade 16. For example, in the illustrated embodiment, one or more light sources may be attached to and/or built into the frame 102, the mounting brackets 150, pivot rods 160, 162, the optical equipment and/or any other suitable component of the system 100 (e.g., the cables 124, 126, 132) in order to illuminate the exterior surfaces 116, 118 of the rotor blade 16. In general, it should be appreciated that any suitable light source may be utilized within the scope of the present subject matter. However, in a particular embodiment of the present subject matter, the light source may comprise a light-emitting diode (LED) array or other light source specifically configured to enhance the appearance of cracks and/or other surface defects of the rotor blade 16.

Further, in several embodiments, the sensing device(s) 106 of the present subject matter may include one or more sensors and/or other mechanisms for determining the location of the frame 102 and/or any other component of the system 100 (e.g., other sensing devices 106) relative to one or more of the exterior surfaces 116, 118 of the rotor blade 16. For example, a proximity sensor or a similar sensor may be mounted to the inner surface 114 of the frame 102 to provide information regarding the proximity of the frame 102 relative to the rotor blade 16. Alternatively, a proximity sensor may be mounted or built into another sensing device 106 to provide information regarding the proximity of the other sensing device 106 relative to the rotor blade 16.

In embodiments in which the sensing device(s) 106 are configured to capture images of the exterior of the rotor blade 16, the sensing device(s) 106 may also include one or more sensors and/or other mechanisms for determining the scale of the images captured by the sensing device(s) 106. For example, in one embodiment, the sensing device(s) 106 may comprise a combination of one or more cameras and one or more laser scaling devices. Each laser scaling device may be configured to project two or more laser beams of known spacing into the field of view of one or more of the cameras such that the size of the cracks and other surface defects captured within the images may be accurately calculated.

Additionally, in further embodiments, one or more of the sensing devices 106 of the present subject matter may comprise a means for detecting and/or determining the vertical position of the frame 102 and/or other sensing devices 106 (e.g., one or more cameras) along the span 104 of the rotor blade 16. As such, the spanwise locations of any defects detected during the inspection may be easily identified. For example, in one embodiment, one or more cables 124, 126, 132 of the disclosed system 100 may be metered or marked to allow the vertical position of the frame 102 and/or sensing devices 106 attached to the frame 102 to be determined. In another embodiment, a suitable measurement device (e.g., a tape measure) may be coupled to one or more of the cables 124, 126, 132. Alternatively, one or more of the sensing devices 106 may comprise one or more linear encoders, position encoders and/or any other suitable linear measurement sensors. For example, in embodiments in which the cables 124, 126, 132 are coupled through a pulley mechanism or other rotational lifting device, a linear encoder may be coupled to the mechanism/device to allow for the accurate determination of the linear displacement of the cable 124, 126, 132. Similarly, a linear encoder may be coupled to one or more of the rollers 156 of the spacer arms 108, 110 to provide information regarding the position of the frame 102 and/or other sensing device(s) 106.

It should be appreciated that, as used herein, the term "cable" refers to any length of material which may be configured to function as described herein. As such, the cables 124, 126, 132 of the present subject matter may include any suitable cables, wires, ropes, tapes, chains, hoses or lines formed from any suitable material. For example, in a particular embodiment, the disclosed cables 124, 126, 132 may comprise one or more electrical cables for supplying power to the sensing devices 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing an external inspection on a rotor blade of a wind turbine, the system comprising:
   a frame configured to extend at least partially around an outer perimeter of the rotor blade;
   a sensing device coupled to said frame; and,
   a first spacer arm extending from said frame, said first spacer arm being configured to contact a pressure side surface of the rotor blade; and,
   a second spacer arm extending from said frame, said second spacer arm being configured to contact a suction side surface of the rotor blade,
   wherein said first and second spacer arms are configured to remain in contact with the pressure and suction side surfaces as said frame is moved along a span of the rotor blade.

2. The system of claim 1, wherein said frame comprises a first frame member and a second frame member, said first and second frame members being pivotally attached around the outer perimeter of the rotor blade.

3. The system of claim 2, wherein said first and second frame members are pivotally attached around the outer perimeter of the rotor blade using at least one pivot rod.

4. The system of claim 2, wherein said first and second frame members are configured to flex relative to the pressure and suction side surfaces of the rotor blade.

5. The system of claim 2, wherein at least one tensioning device is coupled between said first and second frame members.

6. The system of claim 1, wherein said first spacer arm comprises a plurality of spacer arms configured to contact the pressure side surface of the rotor blade and said second spacer arm comprises a plurality of spacer arms configured to contact the suction side surface of the rotor blade.

7. The system of claim 6, wherein each of said plurality of spacer arms forms part of one of a plurality of mounting brackets coupled to said frame.

8. The system of claim 7, wherein said sensing device is attached to one of said plurality of mounting brackets.

9. The system of claim 1, wherein each of said first and second spacer arms includes a roller configured to contact the rotor blade.

10. The system of claim 1, further comprising at least one cable coupled to said frame, said at least one cable being configured to raise and lower said frame along the span of the rotor blade.

11. The system of claim 1, wherein said sensing device comprises a pan tilt zoom camera.

12. The system of claim 1, wherein said sensing device comprises at least one camera coupled to said frame, said at least one camera being configured to capture images of at least one of the pressure side surface, the suction side surface, a leading edge and a trailing edge of the rotor blade.

13. The system of claim 1, further comprising a second sensing device, said second sensing device being configured to detect a location of at least one of said frame and said sensing device relative of the rotor blade.

14. A method for performing an external inspection on a rotor blade, the method comprising:
   positioning a frame around at least a portion of an outer perimeter of the rotor blade;
   coupling a sensing device to said frame;
   moving said frame along the span of the rotor blade;
   contacting a first spacer arm against a pressure side surface of the rotor blade as said frame is moved along the span of the rotor blade; and,
   contacting a second spacer arm against a suction side surface of the rotor blade as said frame is moved along the span of the rotor blade.

15. The method of claim 14, wherein said sensing device comprises a camera, further comprising capturing images of the rotor blade with said camera as said frame is moved along the span of the rotor blade.

16. The method of claim 15, further comprising remotely controlling said camera as said frame is moved along the span of the rotor blade.

17. The method of claim 14, wherein said frame comprises a first frame member and a second frame member, further comprising pivotally attaching said first and second frame members around the outer perimeter of the rotor blade.

18. The method of claim 14, further comprising detecting a location of least one of said frame and said sensing device relative to at least one of the pressure side surface and the suction side surface of the rotor blade.

19. The method of claim 14, further comprising determining a vertical location of at least one of said frame and said sensing device along the span of the rotor blade.

20. The system of claim 1, wherein said first and second spacer arms include telescoping features.

* * * * *